March 3, 1953  J. W. DYER  2,630,556

TEMPERATURE RESPONSIVE MOTOR SPEED CONTROL

Filed Oct. 30, 1950

INVENTOR
JOHN W. DYER

HIS ATTORNEYS

March 3, 1953
J. W. DYER
2,630,556
TEMPERATURE RESPONSIVE MOTOR SPEED CONTROL
Filed Oct. 30, 1950
2 SHEETS—SHEET 2
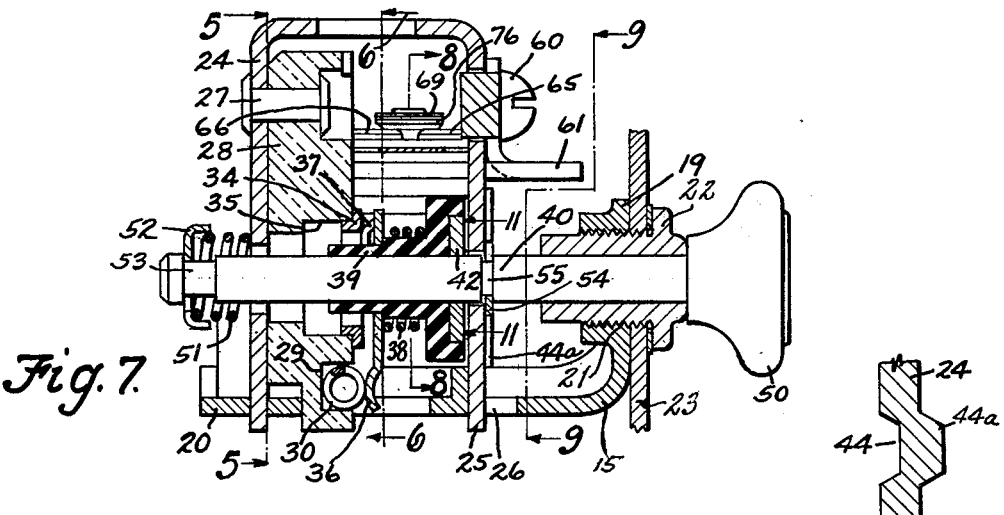
Fig. 7.
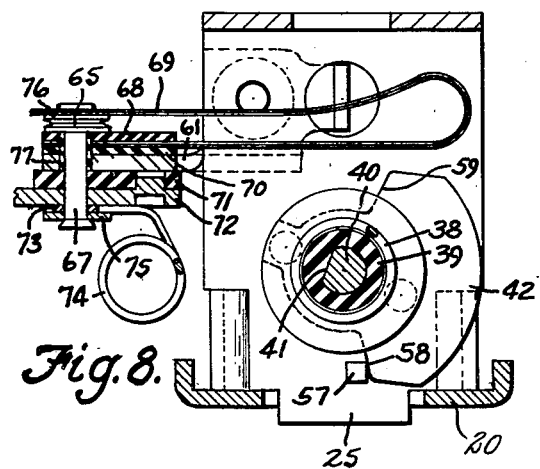
Fig. 8.
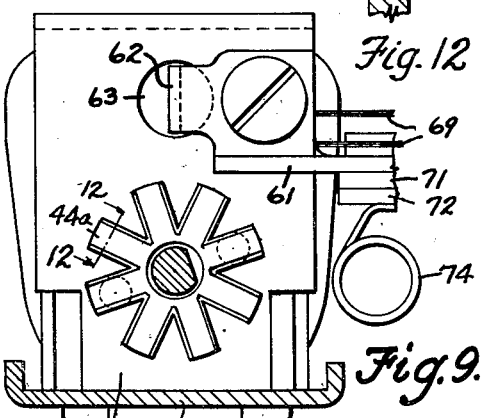
Fig. 9.
Fig. 12.
Fig. 11.
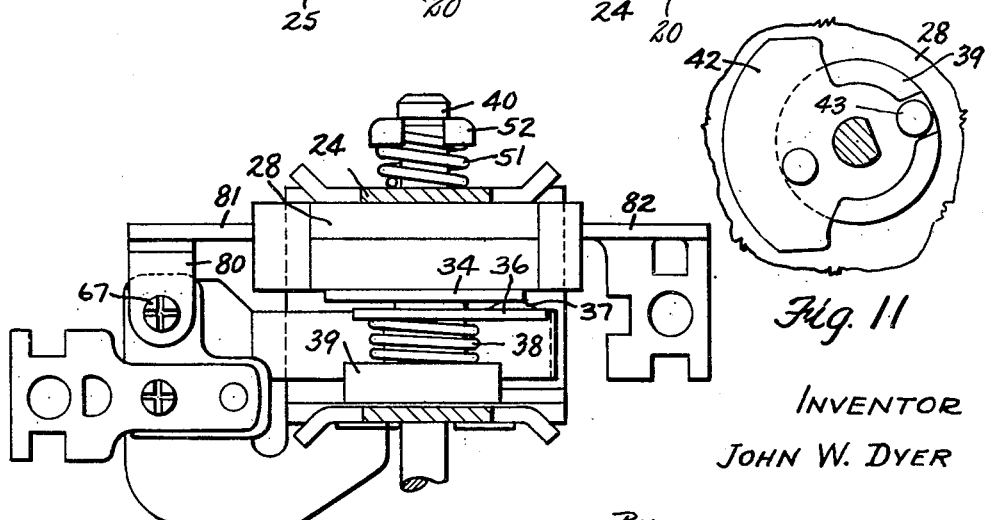
Fig. 10.
INVENTOR
JOHN W. DYER
BY
Willits, Hardman & Fehr
HIS ATTORNEYS Patented Mar. 3, 1953

2,630,556

UNITED STATES PATENT OFFICE 2,630,556

TEMPERATURE RESPONSIVE MOTOR SPEED CONTROL

John W. Dyer, Anderson, Ind., assignor to General Motors Corporation, Detroit, Mich., a corporation of Delaware Application October 30, 1950, Serial No. 193,010

3 Claims. (Cl. 318—332)

This invention relates to the control of the motor which drives the air-circulating fan of passenger car air-heating apparatus and its object is to provide, in conjunction with manual control of fan motor speed, an automatic control which is dependent upon air temperature in the passenger compartment and upon the manual setting of the control of fan motor speed.

In the disclosed embodiment of this invention, this object is accomplished by a thermal switch normally by-passing a resistance in series with the wiper of rheostat which is manually adjusted to control motor speed. The thermal switch includes a bimetal blade located in heat-receiving relation to the rheostat as well as in heat receiving relation to ambient air of the passenger compartment. The temperature which the blade must attain before interrupting the resistance by-pass to reduce fan motor speed is the function of the temperature of the rheostat and ambient air temperature. Therefore, when more of the rheostat is cut in for slower fan motor operation in order to obtain less heating of passenger compartment air, the greater will be heating of the blade by the rheostat. Consequently, the less will be the over-temperature of the passenger compartment air required to cause the bimetal blade to open the resistance short circuit to reduce fan-motor speed. In this way, in moderate weather when over-heating the passenger compartment air is more apt to occur, a more even automatic regulation of air temperature is effected.

Further objects and advantages of the present invention will be apparent from the following description, reference being had to the accompanying drawings wherein a preferred embodiment of the present invention is clearly shown.

Figure 5:
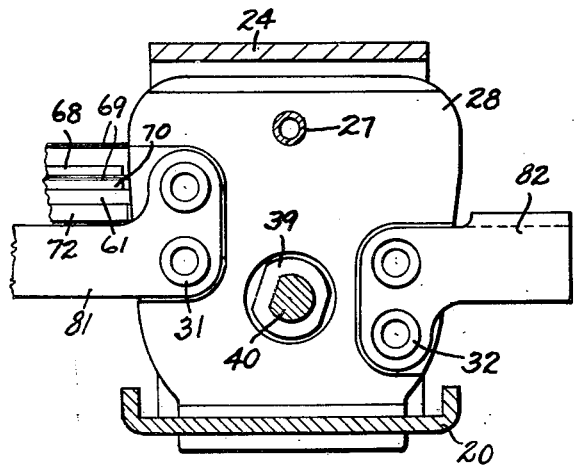
Figure 6:
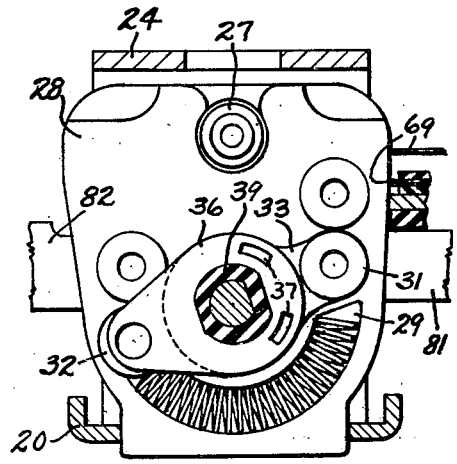

Figs. 5 and 6 are respectively views on lines 5—5 and 6—6 of Fig. 7.

Figure 3:
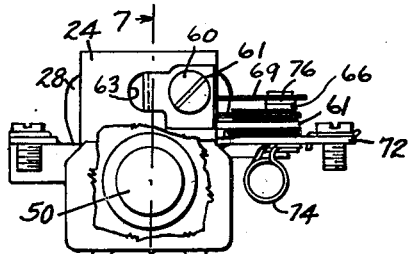

Fig. 7 is a longitudinal sectional view of the device as viewed on line 7—7 of Fig. 3.

Figs. 8 and 9 are views on lines 8—8 and 9—9 respectively of Fig. 7.

Figure 1:
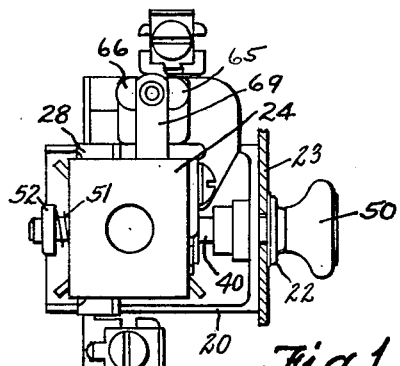
Figs. 1, 2 and 3 are respectively plan, side and end views of control apparatus embodying the present invention.
Figure 2:
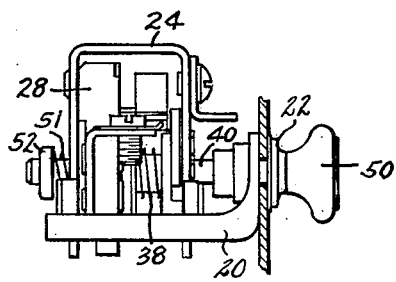

Fig. 10 is a bottom view of the device. Figs. 5 to 10 are drawn to a larger scale than Figs. 1 to 3.

Fig. 11 is a view on line 11—11 of Fig. 7.

Fig. 12 is a view on line 12—12 of Fig. 9.

Referring more particularly to Fig. 7 the device comprises a metal member or bracket 15 having an arm 19 and a base 20. The arm 19 has a threaded flange 21 which receives a bushing 22 by which the bracket 15 is fastened to a support 23 such as the instrument mounting panel of an automobile. The base 20 supports a U-shaped member or frame 24 having projections 25 extending through holes 26 of the base 20 and staked against the underside of the base. Metal eyelets 27 secure to the frame 24 a porcelain member or block 28 which provides an arcuate recess 29 receiving a rheostat or coil of resistance wire 30, the ends of which are connected with metal eyelets 31 and 32, shown in Fig. 6. Eyelet 31 is connected with an arm 33 of a metal ring 34 retained by a pocket 35 in block 28 (Fig. 7). Resistance 30 is engaged by wiper 36 having lugs 37 which engage ring 34, said engagement being effected by a spring 38 surrounding an insulating sleeve 39 drivingly connected with wiper 36 and drivingly connected with a shaft 40 having a flat 41 (Fig. 8) receiving a corresponding flat of the sleeve 39. Spring 38 urges wiper 36 to the left and sleeve 39 to the right against a metal plate 42 with which it is drivingly connected. Plate or detent arm 42 has spherical bosses 43 received by radial notches 44 provided by frame 24, said notches being provided by deforming frame 24 to provide radial projections 44A as seen in Fig. 9.

The shaft 40, which carries an operating handle 50, is rotatably supported by the bushing 22 and is urged to the left (Fig. 7) by a spring 51 located between the left wall of frame 24 and a C-washer 52 received by an annular groove 53 of the shaft 40 and retained therein by the spring 51. Left movement of shaft 40 by spring 51 is limited by the engagement of the right wall of frame 24 with a C-washer 54 received by a neck 55 of shaft 40 and retained by virtue of its position within the inner ends of the radial bosses 44A of frame 24. The turning of shaft 40 by knob 50 is limited by the engagement with a stop 57 by a surface 58 provided by plate 42 or by the surface 59 thereof.

A screw 60 secures to frame 24 a terminal bracket 61 having a tang 62 received by a hole 63 of the frame to prevent rotation of the bracket about the screw. Bracket 60 insulatingly supports contacts 65 and 66 provided by the heads of rivets 67 which maintain the assembly of a stack of parts comprising insulating plate 68, a bimetal spring blade 69, an insulating plate 70, the bracket 61, insulating plate 71, a terminal plate 72 with which a current source is connected, the eyelet 73 of a fixed resistance coil 74 and a washer 75. The bimetal spring 69 supports a contact 76 which the spring normally presses into engagement with contacts 65 and 66. The bimetal spring blade or thermostat 69 is in the form of a loop, a portion of which is located above the rheostat coil 30 so that the thermostat is in heat receiving relation with respect to the rheostat coil as well as to the ambient air of the passenger compartment of the automobile. The rivets 67 which provide the terminal contacts 65 and 66 are insulated from brackets 61 by a nonconducting bushing 77. The ends of the resistance coil 30 which are electrically connected with the contacts 65 and 66 is normally by-passed by contact 76. As shown in Fig. 10 the rivet 67 which provides contact 66 is electrically connected by an angle 80 and a strap 81 with the eyelet 31 (Fig. 6) with which the arm 33 of ring 34 is electrically connected. Thus one end of the rheostat coil 30 and the wiper 36 are electrically connected with contact 66. The eyelet 32 with which the other end of rheostat coil 30 is connected with a terminal 82 which is connected with a series wound electric motor 83 which operates the air circulating fan which causes air to circulate through an air-heater and out into the passenger compartment of an automotive vehicle.

Figure 4:
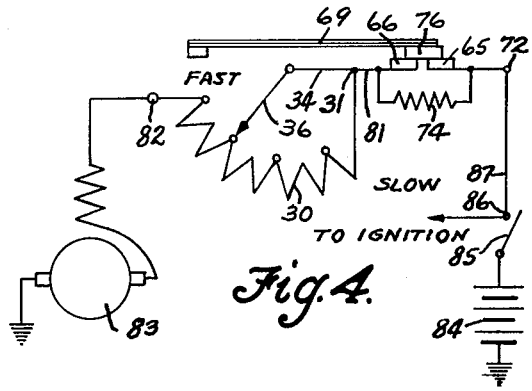
Fig. 4 is a wiring diagram.

Referring to Fig. 4, a battery 84 is connected with terminal 72 by closing an ignition switch 85 which connects the battery to a terminal 86 and a wire 87 with terminal 72. The battery 84 is thus connected with motor 83 through the closed ignition switch 85, terminal 72, fixed contact 65, movable contact 76, fixed contact 66, strap 81, eyelet 31, ring 34, wiper arm 36, rheostat coil 30, and terminal 82. The speed of motor 83 is increased by a clockwise movement of wiper 36 which decreases the effective resistance of the rheostat coil 30 and motor speed is decreased by counterclockwise movement of wiper 36. Wiper 36 is adjusted to maintain at least a certain temperature of the passenger compartment air. In moderate weather when fan motor speed need not be so high as in cold weather the rheostat arm 36 is moved to cut-in more of the rheostat coil 30 therefore the heating effect of the rheostat coil upon the bimetal spring blade 69 will be greater in moderate weather than in cold weather when less of the rheostat coil is effective. Since the temperature of the bimetal spring 69 is a function of temperature derived from the rheostat coil and temperature derived from the ambient air as the heating effect of the rheostat coil increases, less increase of ambient air temperature is required to cause thermostat to separate contact 76 from contacts 65 and 66 in order to break the short circuit of resistance 74 and thus reduce the speed of motor 83. In other words, in moderate weather relatively small increase in temperature above that in which the rheostat is manually set to maintain is required to open the by-pass of resistance 74. Therefore the regulation of the temperature of passenger compartment air can be maintained within relatively close limits. The higher the outside temperature the easier it becomes for the device automatically to maintain a desired compartment air temperature.

While the embodiment of the present invention as herein disclosed, constitutes a preferred form, it is to be understood that other forms might be adopted.

What is claimed is as follows:

1. Apparatus for controlling the speed of a series wound, electric motor which drives the air-circulating fan of passenger car air-heating apparatus, said apparatus comprising a rheostat located in the passenger compartment and providing a connection between a current source and the motor, manually operable means for adjusting the rheostat to vary the speed of the motor in order to change the temperature of passenger compartment; a fixed resistance in the motor circuit; an automatic means normally rendering the fixed resistance ineffective, said automatic means being operative to introduce the fixed resistance into the motor circuit in response to a predetermined increase in the temperature of the passenger car and the rheostat for reducing motor speed to effect a closer control of passenger compartment air temperature.

2. Apparatus for controlling the speed of a series wound, electric motor which drives the air-circulating fan of passenger car air-heating apparatus, said apparatus comprising a rheostat located in the passenger compartment and providing a connection between a current source and the motor, manually operable means for adjusting the rheostat to vary the speed of the motor in order to change the temperature of passenger compartment, a fixed resistance in series with the rheostat, a switch for by-passing the fixed resistance; and a bimetal blade in heat receiving relation to the passenger compartment air and to the rheostat for opening the by-passing switch for reducing motor speed to effect a closer control of passenger car air temperature.

3. An apparatus for controlling the speed of a series wound motor which drives an air circulating fan of an air heating apparatus, said apparatus including a rheostat located within a compartment to be heated and providing a connection between a current source and the motor; a pair of spaced stationary contacts; a fixed resistance connected across the contacts; a thermal element supported in heat-receiving relation with the rheostat and the heated air within the compartment; a movable contact carried by the element normally engaging the stationary contacts for shunting the resistance and to complete the circuit from the source to the motor, said element being heated by the heat from the rheostat and the heated air in the compartment and operable to separate the contacts so as to introduce the fixed resistance in response to a predetermined temperature in the compartment and the rheostat.

JOHN W. DYER.

REFERENCES CITED

The following references are of record in the file of this patent:

UNITED STATES PATENTS

| Number | Name | Date |
|---|---|---|
| 1,675,396 | White | July 3, 1928 |
| 1,853,222 | Pipes | Apr. 12, 1932 |
| 1,879,154 | Fisher | Sept. 27, 1932 |
| 1,999,794 | Thompson | Apr. 30, 1935 |
| 2,424,344 | Veinott | July 22, 1947 |